Nov. 23, 1965     G. W. WYLIE     3,218,753
COMBINED FISH HOOK AND LEADER
Filed April 16, 1963
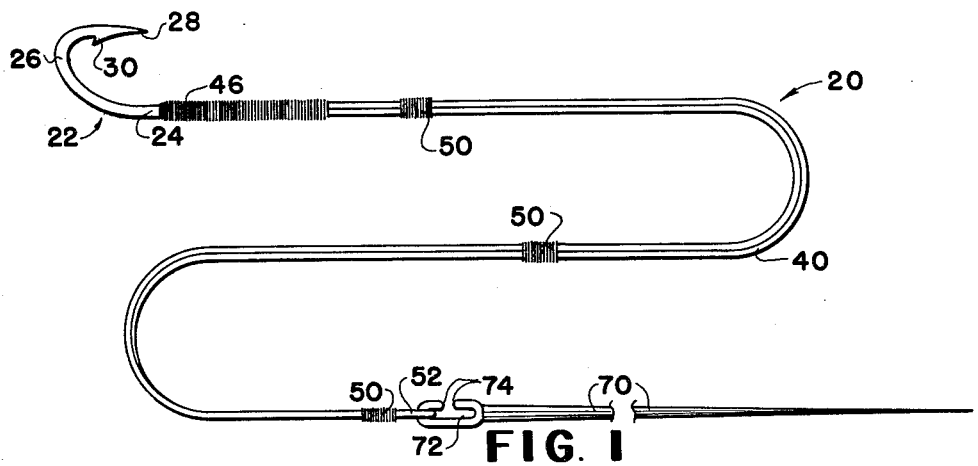
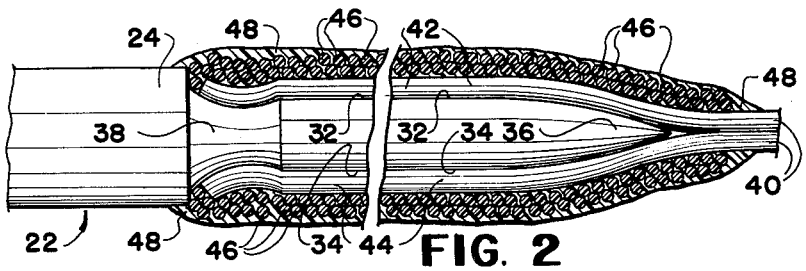
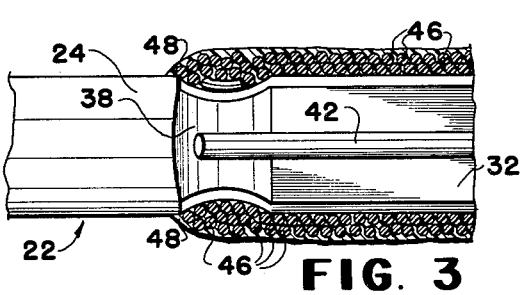  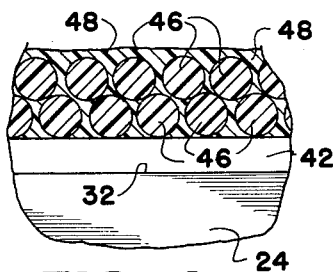
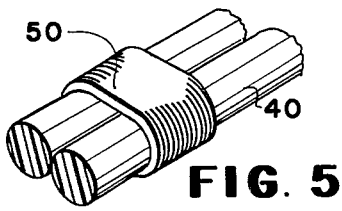
INVENTOR.
GEORGE W. WYLIE
BY
*John H. Wid...*
ATTORNEY United States Patent Office 3,218,753
Patented Nov. 23, 1965

3,218,753
COMBINED FISH HOOK AND LEADER
George W. Wylie, Clay Center, Kans.
Filed Apr. 16, 1963, Ser. No. 273,473
3 Claims. (Cl. 43—44.83)

This invention relates to new fishing means. In a more specific aspect the invention relates to a new fishing hook structure, to a fish hook and leader combination, and to a new means for connecting a leader to a fish hook.

Various types of fishing methods and means are known to the prior art. These include the usual fish hook having a pointed end portion with a barb thereon and a shank portion which normally has an eye on the end thereof by which a leader or fishing line is attached to the hook by connecting a leader or line to the hook eye. In other of the prior art fishing hook structures, braiding is used to attach a leader or line to the shank portion of the hook. In these instances, a bulky shank end portion is provided on the hook which limits the manner of baiting of the hook. With the prior art hook constructions, it is necessary when baiting the hook to pass the pointed end portion of the hook through the bait and to move the bait therealong over the barb of the hook in order to fasten the bait in place. This is frequently somewhat difficult, particularly when worms and other long and difficult baits are used and where minnows or other live baits are used and limits the manner of connecting the bait to the hook without unnecessary damage to the bait or killing of the live bait. Furthermore, some of the prior art baiting methods require unnecessary handling of the bait which is undesirable, particularly where constructed baits are used. Attempts have also been made to bait a hook from the shank end thereof, but no satisfactory means of placing the bait onto the leader on the shank end have been provided.

In accordance with the present invention, new fishing means are provided which overcome many of the disadvantages of the prior art. The new fish hook of the invention has a shank end portion and a flat surface is provided on the shank portion of the hook positioned and shaped to have a leader or the like affixed thereto. The other end portion of the hook is pointed to engage the flesh of the fish or the like and retain same on the hook. In an embodiment of my invention a leader is provided with the fish hook, and the leader has an end portion positioned along the flat surface and is affixed thereto.

The means of the invention for connecting a leader to a hook includes a flat side on a hook and positioning an end portion of a leader along the flat side and fixing same thereto.

The method of baiting a hook for fishing and the like wherein the hook has a leader attached thereto at the shank end portion thereof includes the steps of connecting a needle to the leader and the needle is then passed through a portion of the bait and the bait is moved along the leader until a portion of the bait is on the hook. The needle is then removed from the leader and the baited hook is ready for use.

Accordingly, it is an object of this invention to provide new fishing means.

Another object of the invention is to provide a new fish hook construction.

A further object of the invention is to provide a new fish hook construction having a flat portion thereon shaped and constructed to receive the end portion of a leader or the like for attachment thereto.

Another object of the invention is to provide a new fish hook and leader combination which is constructed and adapted so that bait can be threaded along the leader and onto the hook.

Another object of the invention is to provide a new fish hook and leader construction which is constructed and adapted so that the eye of a needle can be connected to the leader so that the needle can be passed through portions of bait or the like and the bait moved along the leader onto the hook.

Another object of the invention is to provide a new arrangement for connecting a leader to a fish hook wherein the fish hook has flat side portions and an annular groove intersecting the flat side portions with the end portions of a leader being positionable in the groove and along the flat side portions with a thread being wound thereon to fix the end portions of the leader to the hook.

Another object of the invention is to provide new baiting arrangements for fish hooks and the like having a leader thereon wherein a needle is connected to the leader and passed through a portion of the bait so that the bait can be moved along the needle and the leader and onto the hook.

Various other objects, advantages and features of the invention will become apparent to those skilled in the art from the following description taken in connection with the accompanying drawings, in which:

FIG. 1 is a plan view of a preferred specific embodiment of a hook and leader construction of the invention having a needle attached to the leader for baiting the hook.

FIG. 2 is an enlarged partial cross section view of the leader connection to the shank portion of the hook of FIG. 1.

FIG. 3 is an enlarged partial cross section view through the shank portion of the hook of FIG. 1 showing one of the flat sides thereof.

FIG. 4 is an enlarged view showing a preferred means for connecting the end portions of the leader to the hook.

FIG. 5 is an enlarged partial isometric view showing a preferred construction of a band on the leader.

The following is a discussion and description of preferred specific embodiments of the new fishing means of the invention, such being made with reference to the drawings whereon the same reference numerals are used to indicate the same or similar parts and/or structure. It is to be understood that such discussion and description is not to unduly limit the scope of the invention.

Referring now to the drawings in detail, and in particular to FIGS. 1–5, where a preferred specific embodiment of the fishing means of the invention is shown, the fish hook and leader combination is shown generally at 20 and preferably includes a fish hook shown generally at 22 which includes an elongated shank end portion 24 and an integral generally U-shaped end portion 26 with the U-shaped end portion 26 terminating in a sharp point 28. A barb 30 of the usual construction is preferably provided on the U-shaped end portion 26 of hook 22 and is spaced from and projects away from the pointed end or tip 28 of the hook.

The shank end portion 24 of the hook 22 is preferably provided with two flat sides 32 and 34 which are preferably substantially parallel to each other and extend longitudinally along the shank portion of the hook from the end 36 to an intermediate portion of the hook. The end 36 of the shank portion 24 of the hook 22 is preferably tapered to a sharp point as best illustrated in FIG. 2 of the drawings. An annular groove 38 is desirably provided in the shank portion 24 of the hook and is preferably positioned to intersect the inner ends of the flat sides 32 and 34 of the hook opposite from the pointed end 36 of the hook. Preferably, the groove 38 extends deeper into the shank portion 24 of the hook than the flat sides as is illustrated in FIG. 2.

A leader 40 is preferably provided and is connectible to the hook 22. In the preferred embodiment illustrated in the drawings, the leader is preferably constructed of an elongated length of stretchable material, such as nylon, and the end portions 42 and 44 of the leader 40 are desirably positioned along the flat sides 32 and 34, respectively, of the hook shank portion 24 and the ends of the leader are preferably located in the groove 38. Means are provided to fix the end portions 42 and 44 of the leader 40 in place, and preferably this is accomplished by wrapping an elongated piece of fine thread of suitable material, such as cotton, tightly and spirally around the end portions 42 and 44 of the leader 40. Desirably the thread 46 is applied by positioning one end of the thread in the groove 38 and spirally winding the thread around the shank portion 24 of the hook and the end portions 42 and 44 of the leader from the groove 38 outwardly past the tapered or pointed end 36 of the hook back again to the groove where the end portion is secured by tying or other suitable means.

An adhesive is then applied to the thread 46 and to the end portions 42 and 44 of the leader and to the shank portion 24 of the hook to secure same in assembled relation. The adhesive 48 can be a varnish or other substance of the types commonly used when tying flies or fastening portions of fishing means together. As will be seen from FIGS. 2 and 3 of the drawings, the threads 46 and adhesive 48 are preferably positioned so that a substantially smooth outer surface is provided on the shank end portion 24 of the hook 22 which will provide a minimum of interference or obstruction when baiting the hook as described hereinafter. This is particularly desirable around the pointed end 36 of the hook 22 since it will normally pass through the bait first and therefore should present a generally tapered appearance as illustrated in FIG. 2.

In the preferred embodiment of the fishing means illustrated in the drawings a plurality of elongated bands 50 are provided and are positioned around both strands of the leader 40 in the manner best illustrated in FIGS. 1 and 5. Preferably the bands 50 are constructed and positioned on the leader to be held in place by a built-in pressure and be easily movable along the leader 40. This construction can be obtained by stretching the leader 40 to reduce the diameter thereof slightly and then tightly wrapping a length of cotton thread or the like around the stretched leader and securing the end portions thereof to result in a band 50 as illustrated in the drawings. When the leader is relaxed it expands and the pressure between the leader and the band 50 is sufficient to hold same in position. When it is desired to adjust the band 50 along the leader, the leader 40 is again stretched and the band 50 will easily slide therealong.

In construcing the hook 22 and fixing the leader 40 to the hook, the hook can be formed from an elongated piece of metallic material and the sharp end portion 28 and the end 36 of the shank portion 24 can be formed by grinding, cutting or other suitable steps. The barbed portion 30 of the hook can be formed by cutting a groove in the hook immediately behind the end 28 to force a portion of the metal upwardly and outwardly to form a barb. The U-shaped portion 26 can be formed by a bending operation. The flat sides 32 and 34 are preferably formed by removing a portion of the metal from a normally round shank portion 24 by cutting, grinding, or other suitable means. If desired, the flat sides can be formed by a stamping operation. The groove 38 is desirably formed by cutting or grinding the shank portion 24 of the hook. With the end portions 42 and 44 of the leader 40 then in position on the flat sides and in the groove of the hook, the thread 46 is then wrapped into place by starting in the groove and proceeding helically around the shank portion of the hook to a position beyond the end 36 of the hook and then returning the thread to the groove so that both ends of the thread are desirably in the groove. The adhesive 48 is then placed in position by brushing, spraying, or dipping the end of the hook into the adhesive and the adhesive is dried and thus fixedly connects the thread and the end portions of the leader to the hook. The loop end 52 of the leader is then moved away from the hook to stretch the leader and a thread is then wrapped around the leader to form the bands 50 while the leader is stretched and the leader is then relaxed so that the band is held in place by the pressure of the leader 40 tending to expand. The hook and the leader combination are then ready for use.

The hook 22 of the invention can be baited in the usual and common manner by placing the pointed end 28 through the bait and moving the bait across the barb 30 and onto the hook and positioned theron in any suitable manner. However, the hook 22 constructed in the preferred manner permits new baiting methods. For example, means are preferably provided with the leader 40 so that the looped end portion 52 thereof can be passed through bait. For this purpose, a needle 70 is provided which has an eye 72 in one end and a slot or opening 74 is provided through a side portion of the eye which is of a size to receive the loop 52 of the leader 40 so that the loop 52 can be passed therethrough and moved to a position at the base of the eye 72, as illustrated in FIG. 1. The band 50 on the leader 40 is then preferably moved to a position adjacent the eye 72 of the needle 70 so that the loop 52 will not inadvertently become disengaged or removed from the needle. The assembled needle may then be passed through the bait which is then slid along the leader to be positioned on the hook 22. The needle may then be removed.

With the fishing means of the invention, new and improved hook and leader constructions are provided which permit new and novel methods of baiting the hook for fishing which are not permitted by prior art structures, particularly where the hooks have eyes or the like which cannot easily be passed through the body of the bait being used without destroying or injuring the bait. The bait can be connected to the hook in such a manner that its life is extended and, where non-living baits are used, they are positioned on the hook and leader to be most effective.

While the invention has been described in connection with preferred specific embodiments thereof, it will be understood by those skilled in the art that this description is intended to illustrate and not to limit the scope of the invention which is defined by the claims.

I claim:

1. Fishing means comprising, in combination, a fish hook having an elongated shank end portion and an integral generally U-shaped end portion with said end portions both being pointed on the ends thereof, a barb on said U-shaped end portion of said hook adjacent and spaced from said pointed end thereof and projecting away from said pointed end of said U-shaped end portion, said shank end portion of said hook having two flat and substantially parallel sides extending therealong from said pointed end thereof, an annular groove in the outer surface of said shank portion of said hook intersecting the ends of said flat sides opposite from said pointed end of said shank portion of said hook, said groove extending deeper into said shank portion of said hook than said flat sides, an elongated leader of a stretchable plastic material being folded at the center and having the end portions thereof positioned along said flat sides of said shank portion of said hook and extending into said groove in said shank portion of said hook, an elongated piece of fine thread tightly and spirally surrounding said end portions of said leader and extending from said groove past said pointed end of said shank portion of said hook, an adhesive connected to said thread and said end portions of said leader and said shank portion of said hook to secure same in assembled relation, a plurality of elongated bands positioned around said leader between said end portions thereof and the center of said leader, said bands being movable along said leader by stretching said leader to reduce the thickness thereof, said fishing means being constructed and adapted so that said hook can receive and hold bait or the like and said center portion of said leader is connectible to a fishing line.

2. Fishing means comprising, in combination, a fish hook having a shank end portion and a hook end portion, said shank end portion of said hook having two flat opposite and substantially parallel sides and an annular groove in the outer surface thereof intersecting corresponding inner end portions of said flat sides, an elongated leader being folded and having the end portions thereof positioned along said flat sides of said shank portion of said hook and extending into said groove, means fixedly connecting said end portions of said leader to said hook, and a band positioned around said leader between said end portions of said leader and the center portion thereof, said fishing means being constructed and adapted so that said hook can receive and hold bait or the like and said center portion of said leader is connectible to a fishing line.

3. A fish hook having an elongated shank end portion and a generally U-shaped end portion with said end portions both being pointed on the ends thereof, a barb on said U-shaped end portion of said hook adjacent and spaced from said pointed end thereof and projecting away from said pointed end of said U-shaped end portion, said shank portion of said hook having two flat and substantially parallel sides extending therealong from said pointed end thereof, an annular groove in the outer surface of said shank portion of said hook intersecting the end portions of said flat sides opposite from said pointed end of said shank portion of said hook with said groove extending deeper into said shank portion of said hook than said flat sides.

References Cited by the Examiner
UNITED STATES PATENTS

| | | | |
|---|---|---|---|
| 1,093,000 | 4/1914 | Kinsey | 43—44.83 |
| 1,110,246 | 9/1914 | Viers et al. | 43—44.83 |
| 1,457,762 | 6/1923 | Wipp | 43—44.83 |
| 1,741,034 | 12/1929 | Newton et al. | 43—44.98 X |
| 1,915,876 | 6/1933 | Wallace | 43—44.83 |
| 2,094,267 | 9/1937 | Faria | 43—44.83 |
| 2,189,841 | 2/1940 | Skoverski | 43—44.83 |
| 2,241,367 | 5/1941 | Sarff | 43—43.15 X |
| 2,518,590 | 8/1950 | Andrist | 43—4 |
| 2,533,418 | 12/1950 | Benoit | 43—44.83 |
| 2,584,231 | 2/1952 | Schmidt | 43—4 |
| 2,603,026 | 7/1952 | Duty | 43—4 X |
| 2,748,524 | 6/1956 | Schinzel | 43—44.83 |

FOREIGN PATENTS 14,975  of 1908  Great Britain.

SAMUEL KOREN, *Primary Examiner.*